United States Patent [19]

Bentley et al.

[11] Patent Number: 4,654,852
[45] Date of Patent: Mar. 31, 1987

[54] ON-LINE PROBLEM-DETERMINATION PROCEDURE FOR DIAGNOSIS OF FAULTS IN A DATA-PROCESSING SYSTEM

[75] Inventors: Alan M. Bentley; Edward W. Fitch; John W. Freeburger; Gary P. Goulet, all of Rochester, Minn.

[73] Assignee: International Business Machines Corporation, Armonk, N.Y.

[21] Appl. No.: 610,441

[22] Filed: May 15, 1984

[51] Int. Cl.[4] ............... G01R 31/28; G06F 11/00
[52] U.S. Cl. ............... 371/29; 364/900; 371/16
[58] Field of Search ............... 371/29, 16, 15; 364/200, 900; 324/73 R, 73 AT

[56] References Cited

U.S. PATENT DOCUMENTS

| | | | |
|---|---|---|---|
| 3,575,589 | 4/1971 | Neema et al. | 371/29 X |
| 4,135,662 | 1/1979 | Dlugos | 371/29 |
| 4,424,576 | 1/1984 | Lange et al. | 364/900 |
| 4,434,489 | 2/1984 | Blyth | 371/29 |
| 4,499,581 | 2/1985 | Miazga et al. | 371/16 X |
| 4,545,013 | 10/1985 | Lyon et al. | 364/200 |

Primary Examiner—Charles E. Atkinson
Attorney, Agent, or Firm—J. Michael Anglin

[57] ABSTRACT

A data-processing subsystem diagnoses problems in one of its own subsystems, by sensing the configuration of the subsystem, displaying both text and graphic information concerning control settings and indicators on components of the subsystem, displaying information directing an operator to perform certain actions, receiving his inputs, then selecting and performing tests upon the subsystem components based upon the configuration, previous test results, and operator inputs.

1 Claim, 32 Drawing Figures

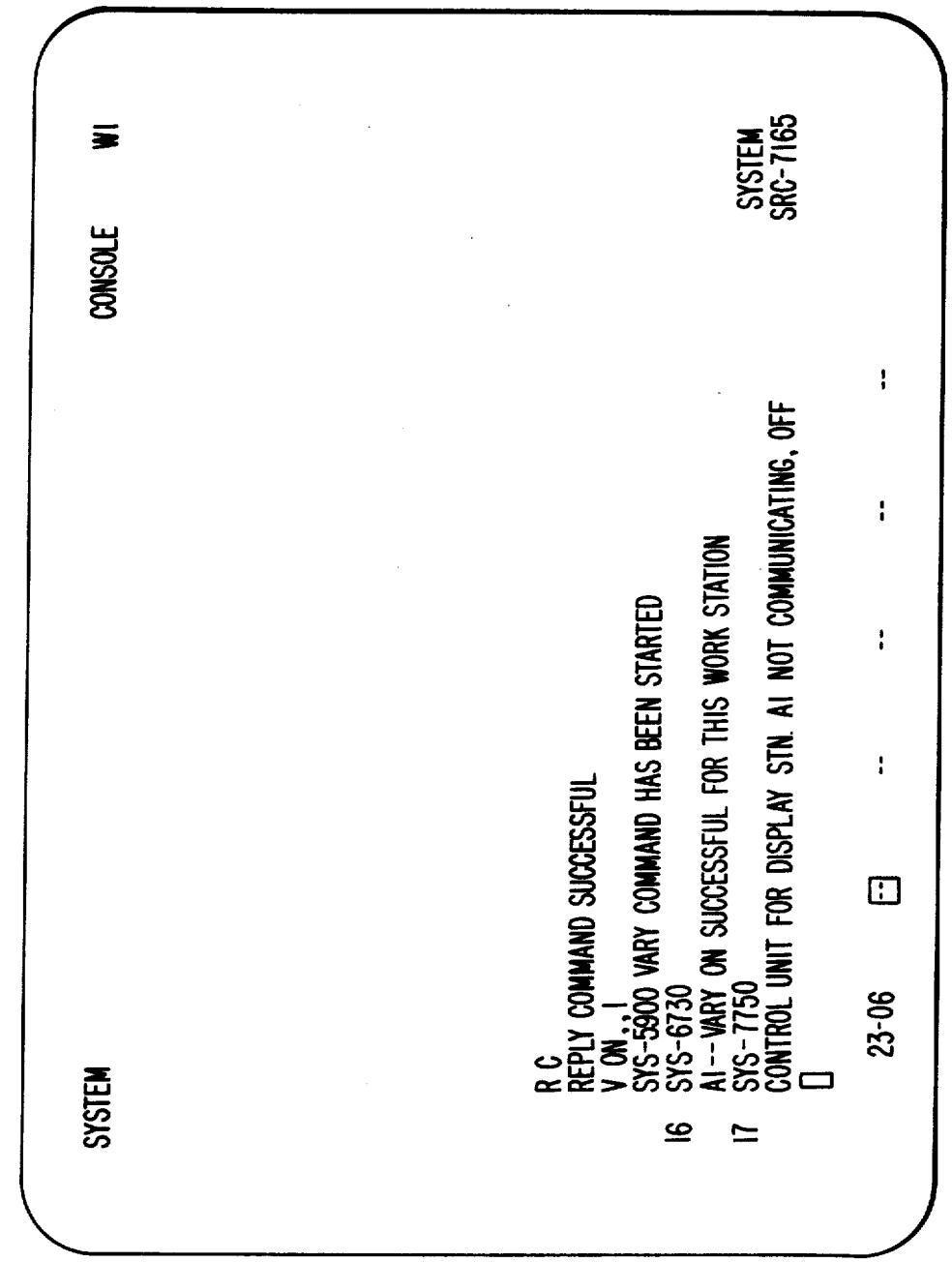

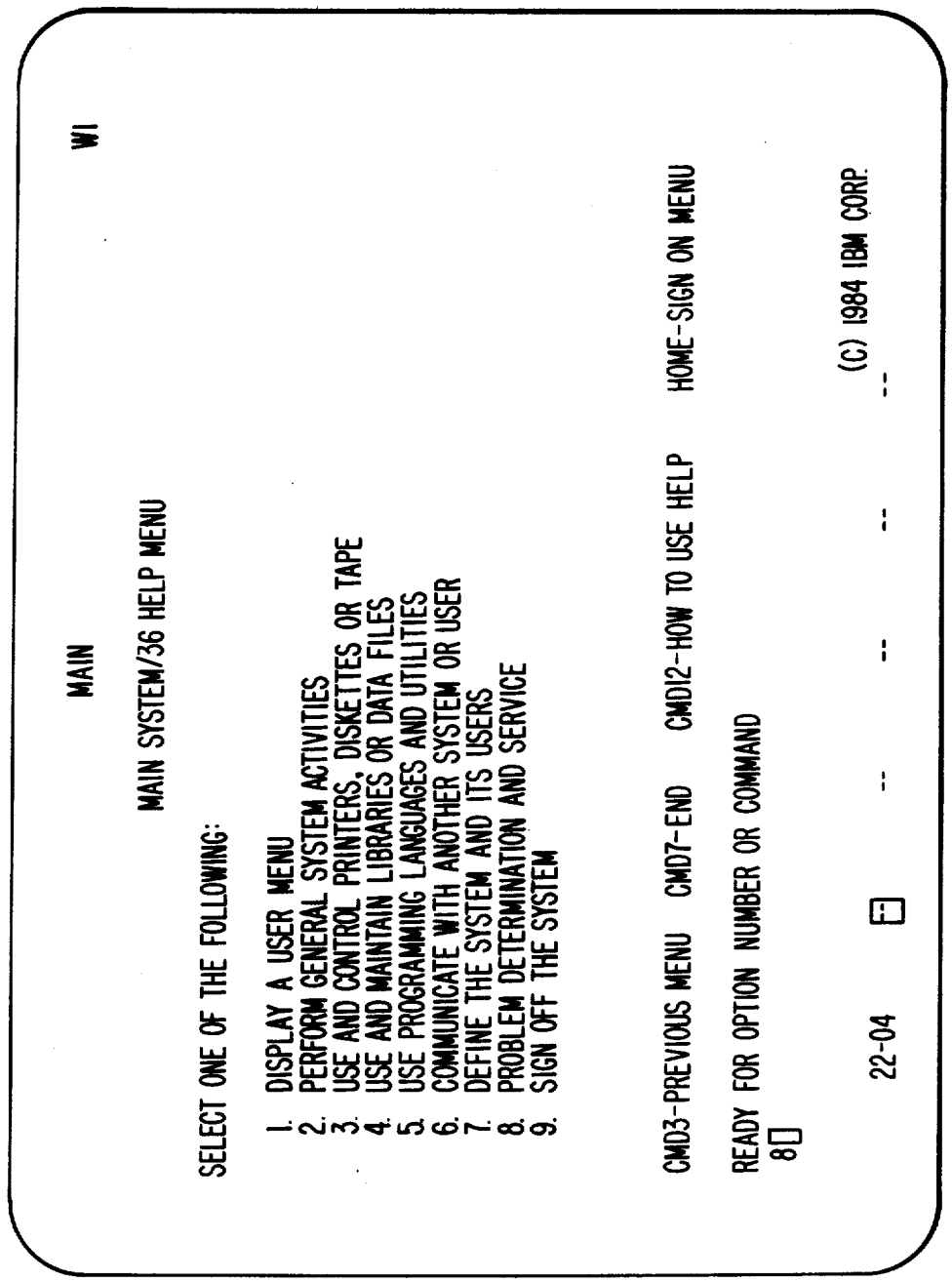
FIG. 2.2

FIG. 2.3

ONLINE PROBLEM DETERMINATION

IT IS SUGGESTED THAT YOU RUN THESE PROBLEM DETERMINATION AIDS FROM THE SYSTEM CONSOLE.

PRESS THE [ENTER] KEY TO CONTINUE.

NOTE: YOU CAN PRESS THE [HELP] KEY FOR MORE INFORMATION WHENEVER THE WORD HELP APPEARS IN THIS CORNER OF THE SCREEN.
***
**
*

CMD6: DISPLAY COMMAND KEYS HELP

SOLVING A DISPLAY STATION PROBLEM

WHERE IS THE PROBLEM OCCURRING ?

1. THE PROBLEM IS OCCURRING AT A LOCAL DISPLAY STATION.
2. THE PROBLEM IS OCCURRING AT A REMOTE DISPLAY STATION.
3. YOU DON'T KNOW.

2☐ MAKE SELECTION
24-03

CMD6: DISPLAY COMMAND KEYS HELP    9060 9060

SOLVING A COMMUNICATIONS PROBLEM

THE FIRST THING THAT YOU WILL HAVE TO DO IS ANSWER ALL COMMUNICATIONS MESSAGES THAT MAY HAVE BEEN GENERATED.

A SHORT TUTORIAL CAN BE PRINTED TO HELP YOU ANSWER THE MESSAGES PROPERLY. IT IS RECOMMENDED THAT YOU VIEW THE TUTORIAL AND USE IT TO HELP YOU ANSWER THE MESSAGES.

SELECT ONE OF THE FOLLOWING:

1. VIEW THE TUTORIAL
2. PRINT THE TUTORIAL
3. CONTINUE WITHOUT THE TUTORIAL

MAKE SELECTION
24-02

CMD6: DISPLAY COMMAND KEYS

REMOTE DISPLAY STATION PROBLEMS

CAN YOU USE ANY DISPLAY STATIONS OR PRINTERS AT THE REMOTE CONTROLLER WHERE YOU ARE HAVING THE PROBLEM?

1. YES
2. NO
3. YOU DON'T KNOW

3 MAKE SELECTION
24-03

CMD6 DISPLAY COMMAND KEYS
9120 9120

REMOTE DISPLAY STATION PROBLEMS

DID YOU GET A SYS-3405, SYS-6720, SYS-6750, OR SYS-7750 COMMUNICATIONS MESSAGE?

1. YES
2. NO
3. YOU DON'T KNOW

MAKE SELECTION
24-03

CMD6: DISPLAY COMMAND KEYS

BEFORE YOU CAN FIGURE OUT WHAT IS WRONG WITH YOUR REMOTE
WORK STATIONS, YOU MUST KNOW WHICH LINE IS FAILING.

SELECT ONE OF THE FOLLOWING
1. LINE 1 IS FAILING
2. LINE 2 IS FAILING
3. LINE 3 IS FAILING
4. LINE 4 IS FAILING
5. YOU DON'T KNOW WHICH LINE IS FAILING

5☐ MAKE SELECTION ☐
24-03

CMD6: DISPLAY COMMAND KEYS                     U011  U011

YOU CAN FIND OUT WHICH LINE IS FAILING BY ENTERING THE ID
    OF ONE OF THE DEVICES THAT SEEMS TO BE FAILING. WHEN THE
    PROBLEM FIRST HAPPENED, A SERIES OF MESSAGES SHOULD HAVE
    BEEN DISPLAYED. EACH OF THESE MESSAGES CONTAINS AN ID OF
    ONE OF THE DEVICES THAT IS FAILING.

ENTER ONE OF THESE DEVICE IDS IN THE SPACE BELOW.

U015    U015
 ▣ KEY IN DATA AND PRESS ENTER TO CONTINUE    CMD6: DISPLAY COMMAND KEYS
    24-02    ▭          ⋮         ⋮          ⋮
```

*FIG. 2.10*

THE FAILING DEVICE IS ATTACHED TO LINE I. WRITE DOWN THIS LINE NUMBER AS YOU WILL NEED TO KNOW IT LATER.

PRESS [ENTER] TO CONTINUE.

CMD6: DISPLAY COMMAND KEYS 24-02

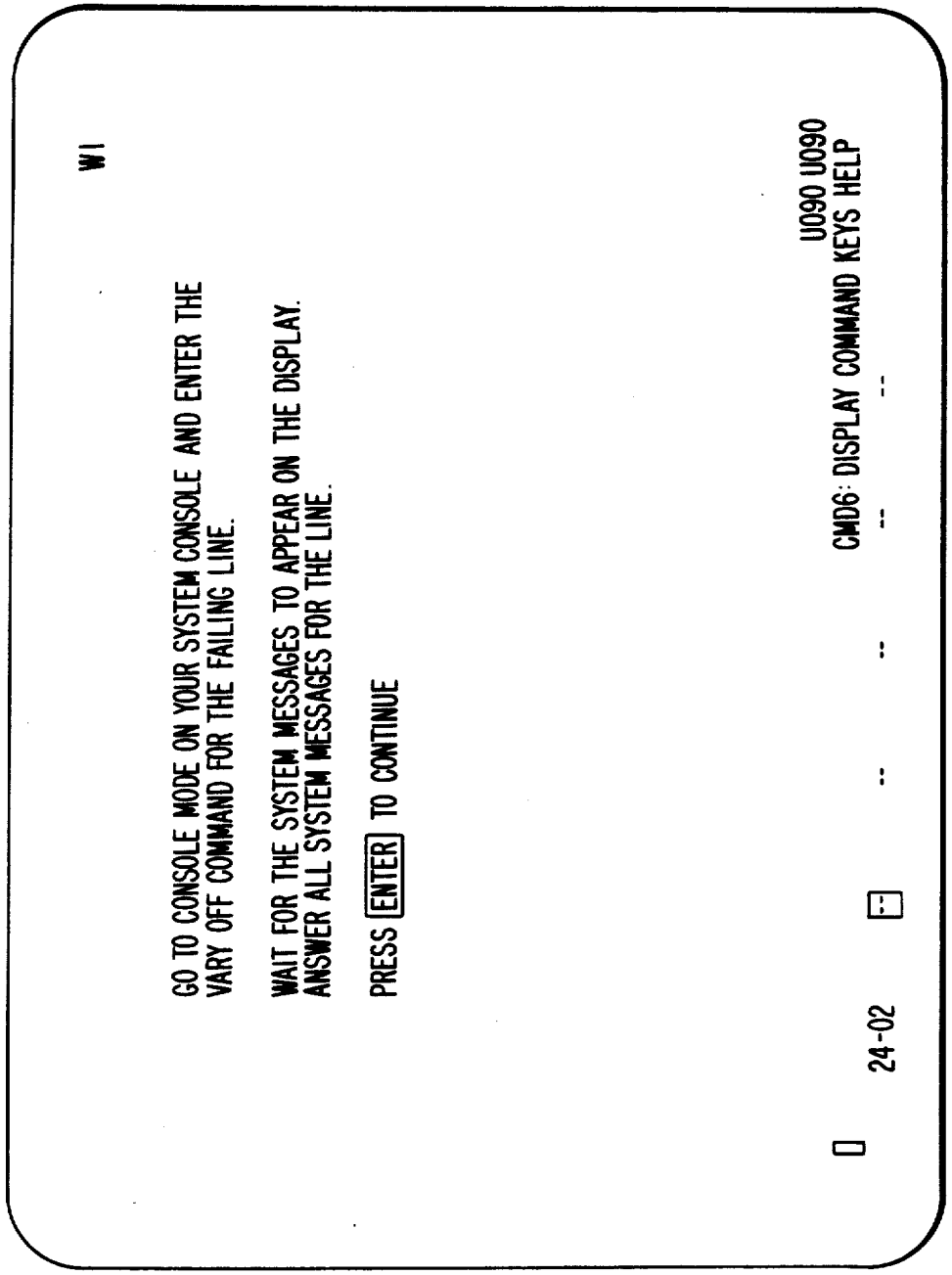
FIG. 2.11

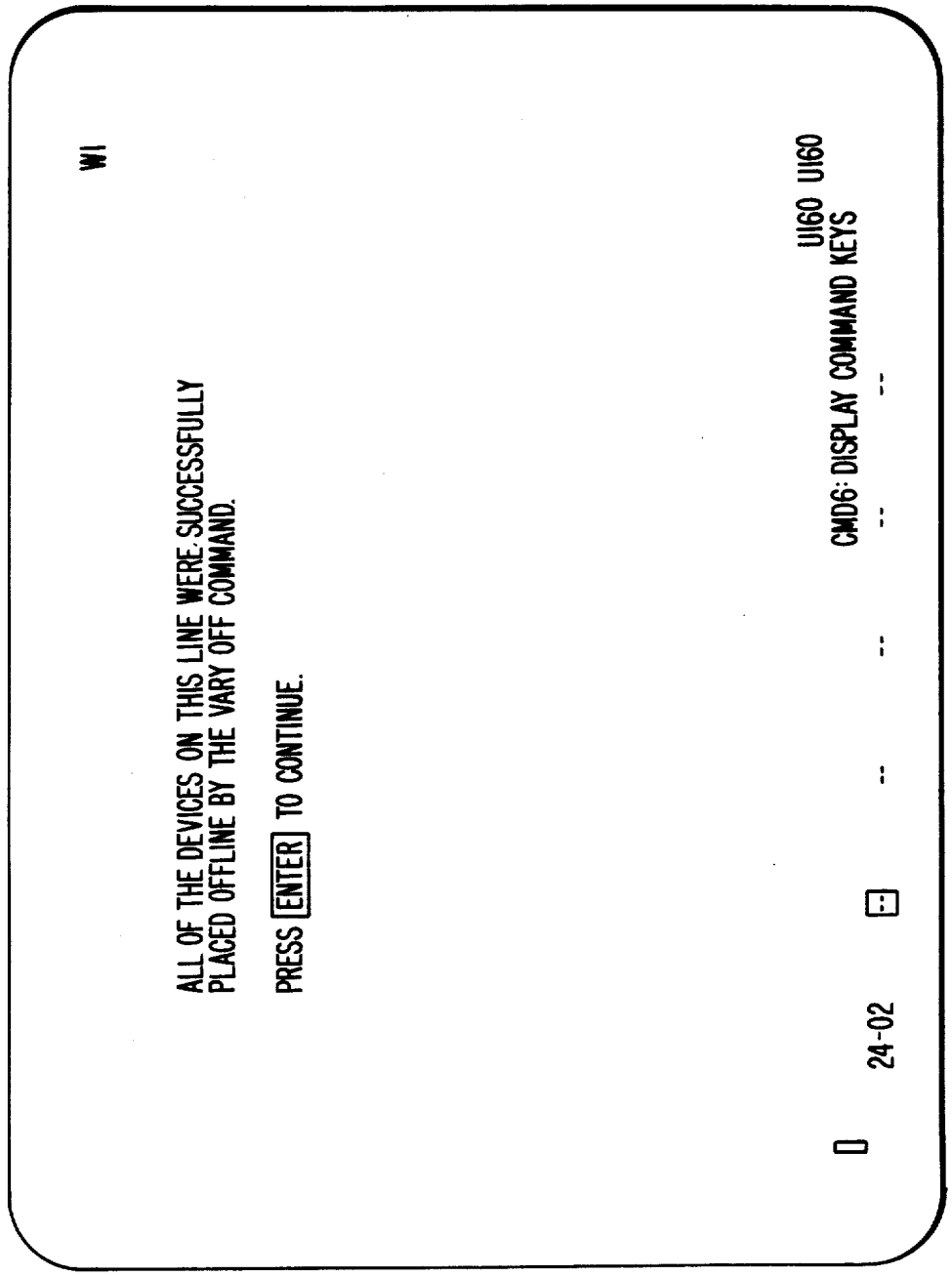
FIG. 2.12

GO TO CONSOLE MODE ON THE SYSTEM CONSOLE AND ENTER THE
VARY ON COMMAND FOR THE FAILING LINE.

WAIT FOR THE SYSTEM MESSAGES TO APPEAR ON THE DISPLAY.
ANSWER ALL SYSTEM MESSAGES FOR THE LINE.

PRESS [ENTER] TO CONTINUE 24-02    [:]                      CMD6: DISPLAY COMMAND KEYS HELP    UI65 UI65
```

FIG. 2.14

THE VARY ON COMMAND WAS NOT SUCCESSFUL FOR THIS LINE.

PRESS [ENTER] TO CONTINUE.

24-02

CMD6: DISPLAY COMMAND KEYS

GO TO CONSOLE MODE ON THE SYSTEM CONSOLE AND ENTER THE
  VARY OFF COMMAND FOR THE FAILING LINE.

WAIT FOR THE SYSTEM MESSAGES TO APPEAR ON THE DISPLAY.
  ANSWER ALL SYSTEM MESSAGES FOR THE LINE.

PRESS [ENTER] TO CONTINUE.

24-02   ⊞                                                        U210 U210
  □               ::         ::          ::        CMD6: DISPLAY COMMAND KEYS
```

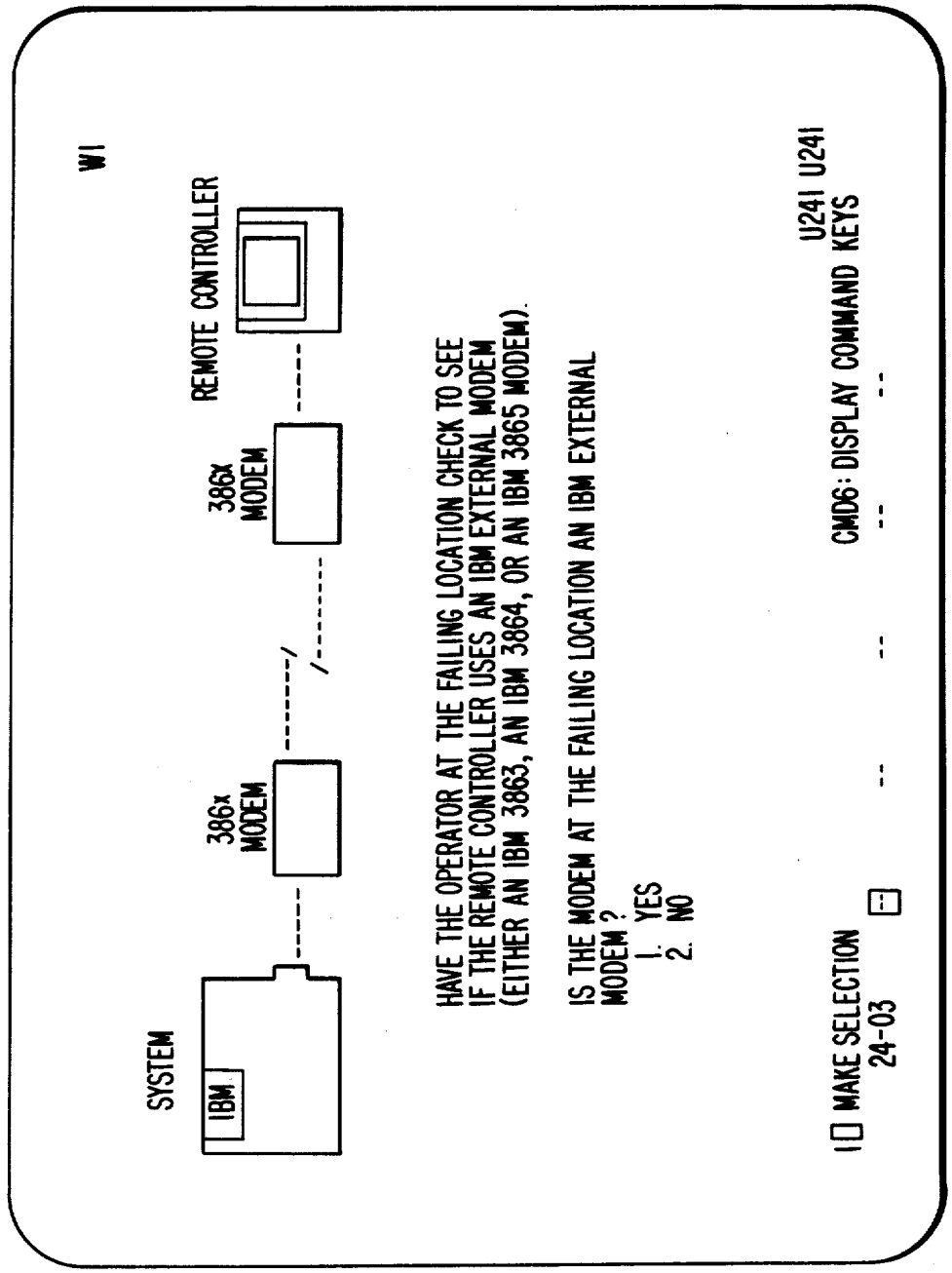
FIG. 2.16

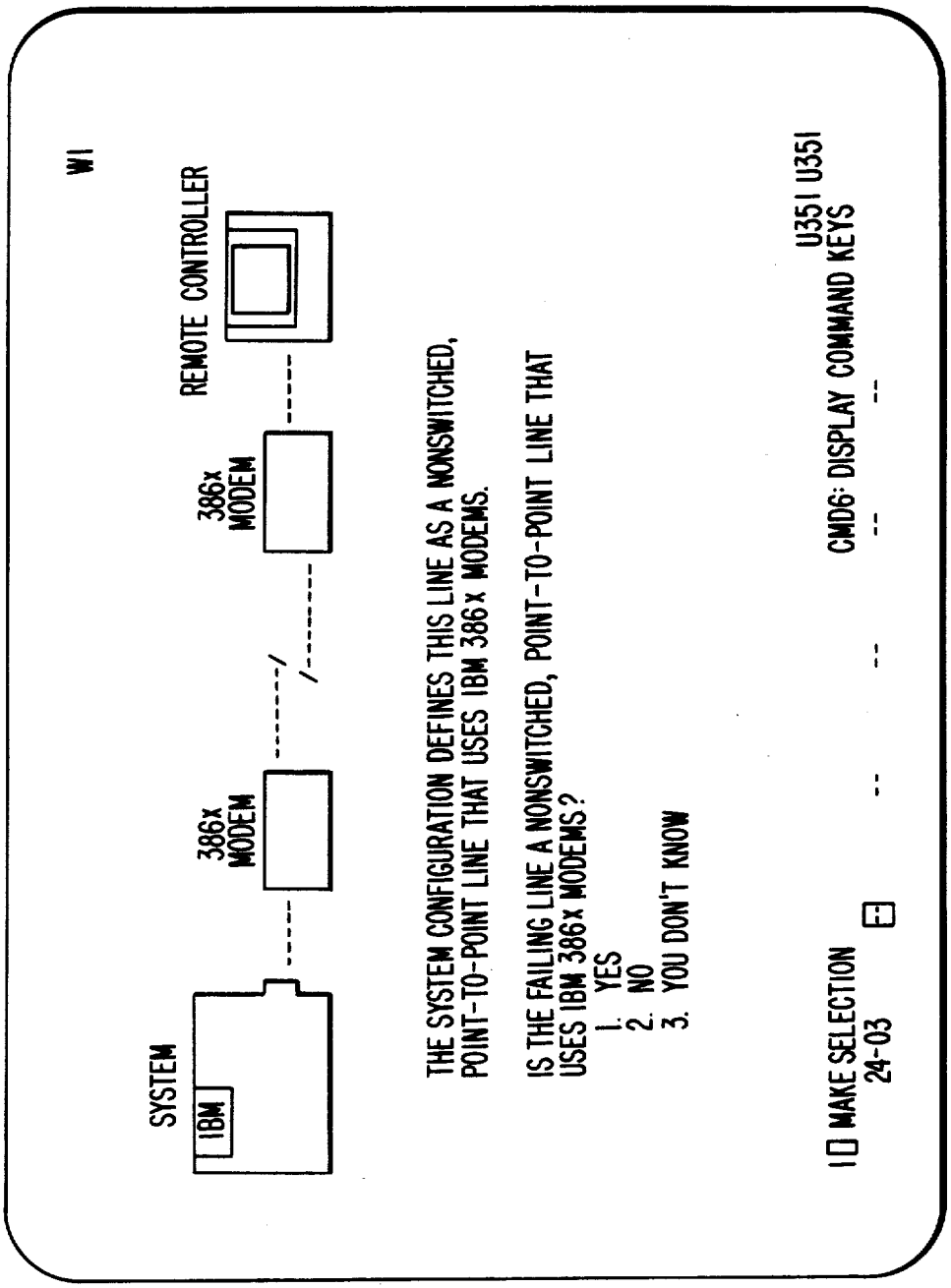
FIG. 2.17

THE FIRST STEP IN FIGURING OUT WHAT IS WRONG WITH THE
FAILING LINE IS TO RUN THE COMMUNICATIONS TEST PROGRAM.
THIS PROGRAM PERFORMS A SERIES OF TESTS ON THE SYSTEM.

PRESS [HELP] FOR INFORMATION ON THE TESTS RUN BY THE PROGRAM.

PRESS [ENTER] TO START THE COMMUNICATIONS TEST PROGRAM.

24-02

A000 A000
CMD6: DISPLAY COMMAND KEYS   HELP

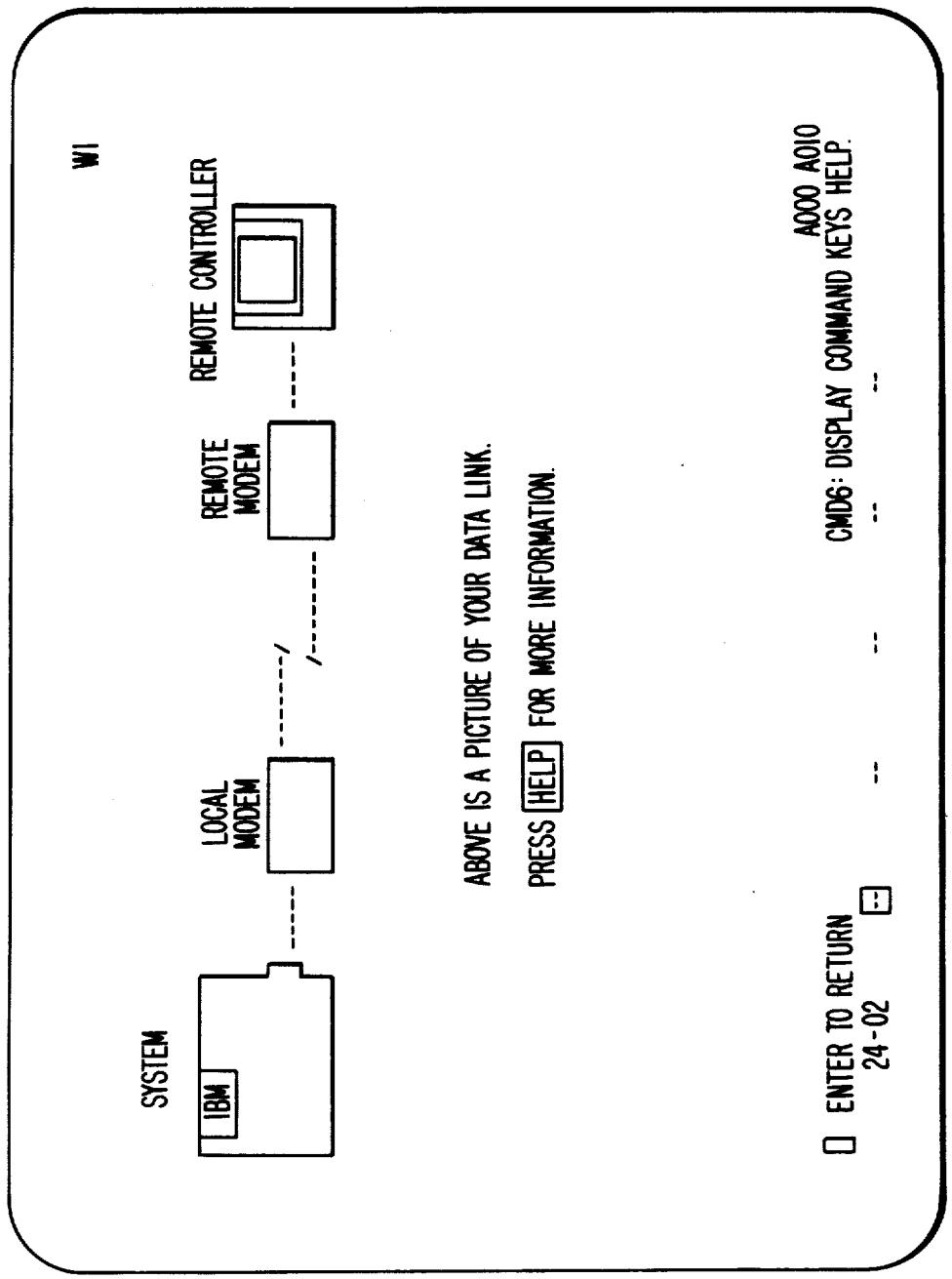
FIG. 2.19

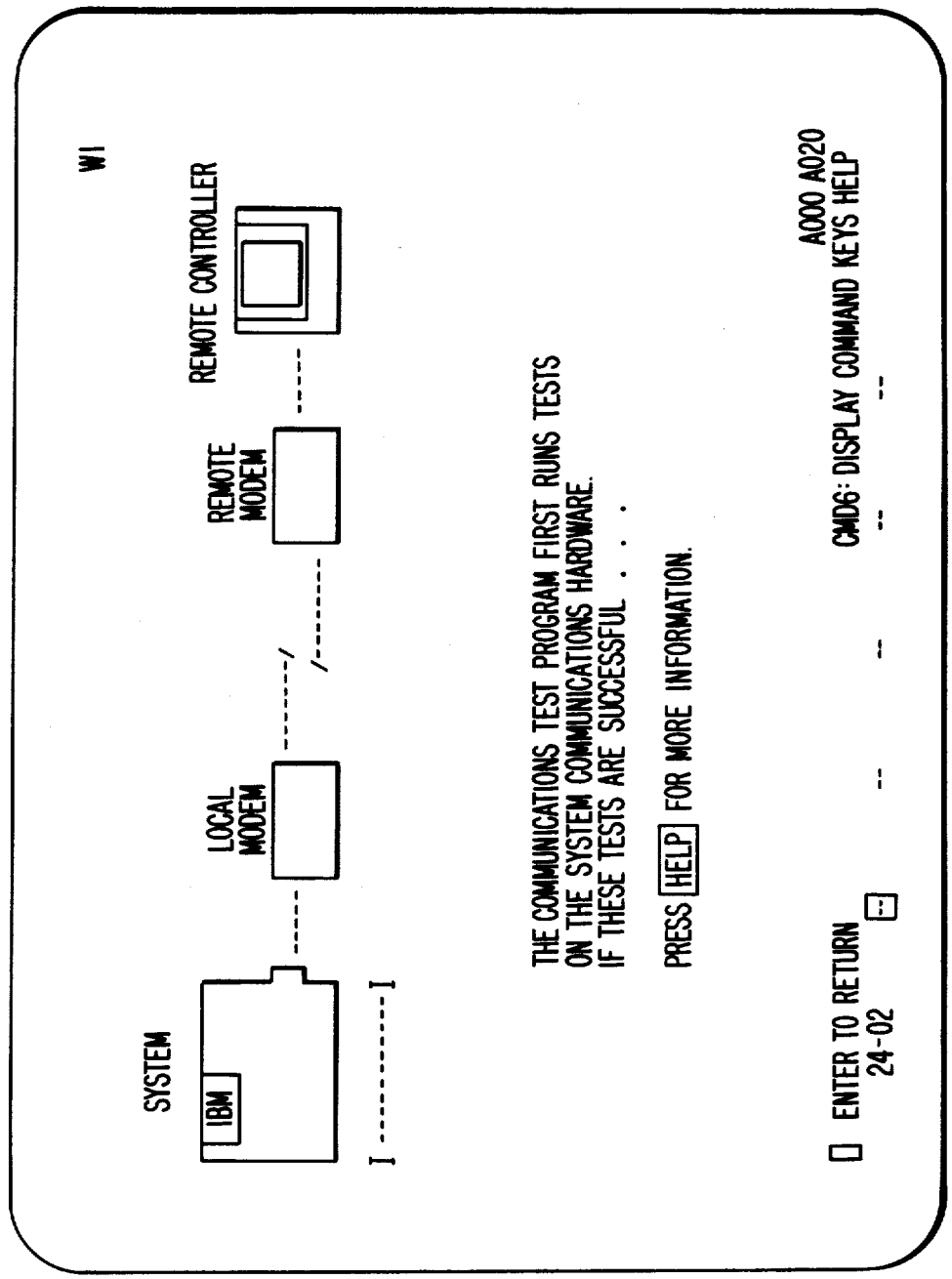
FIG. 2.20

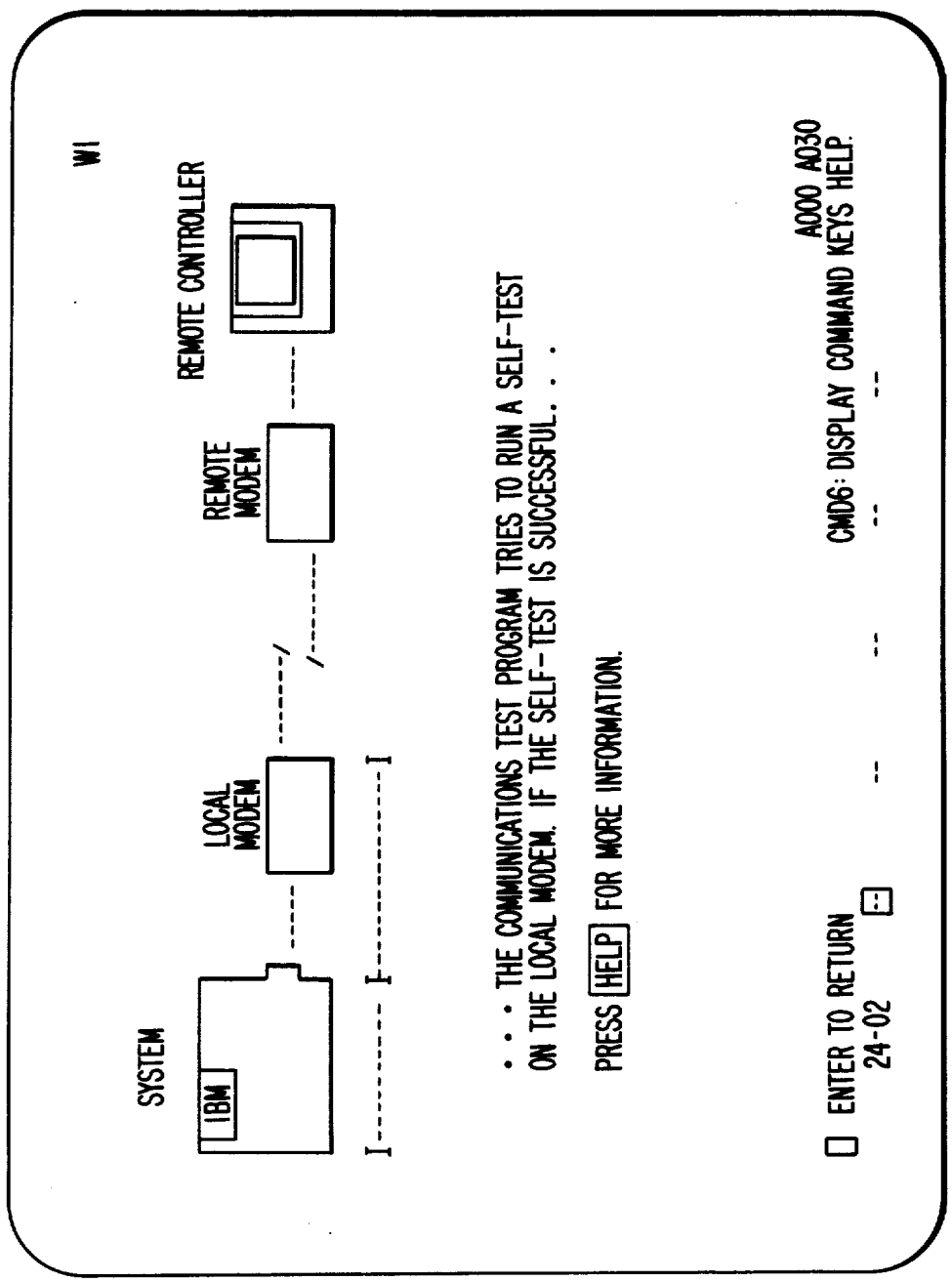
FIG. 2.21

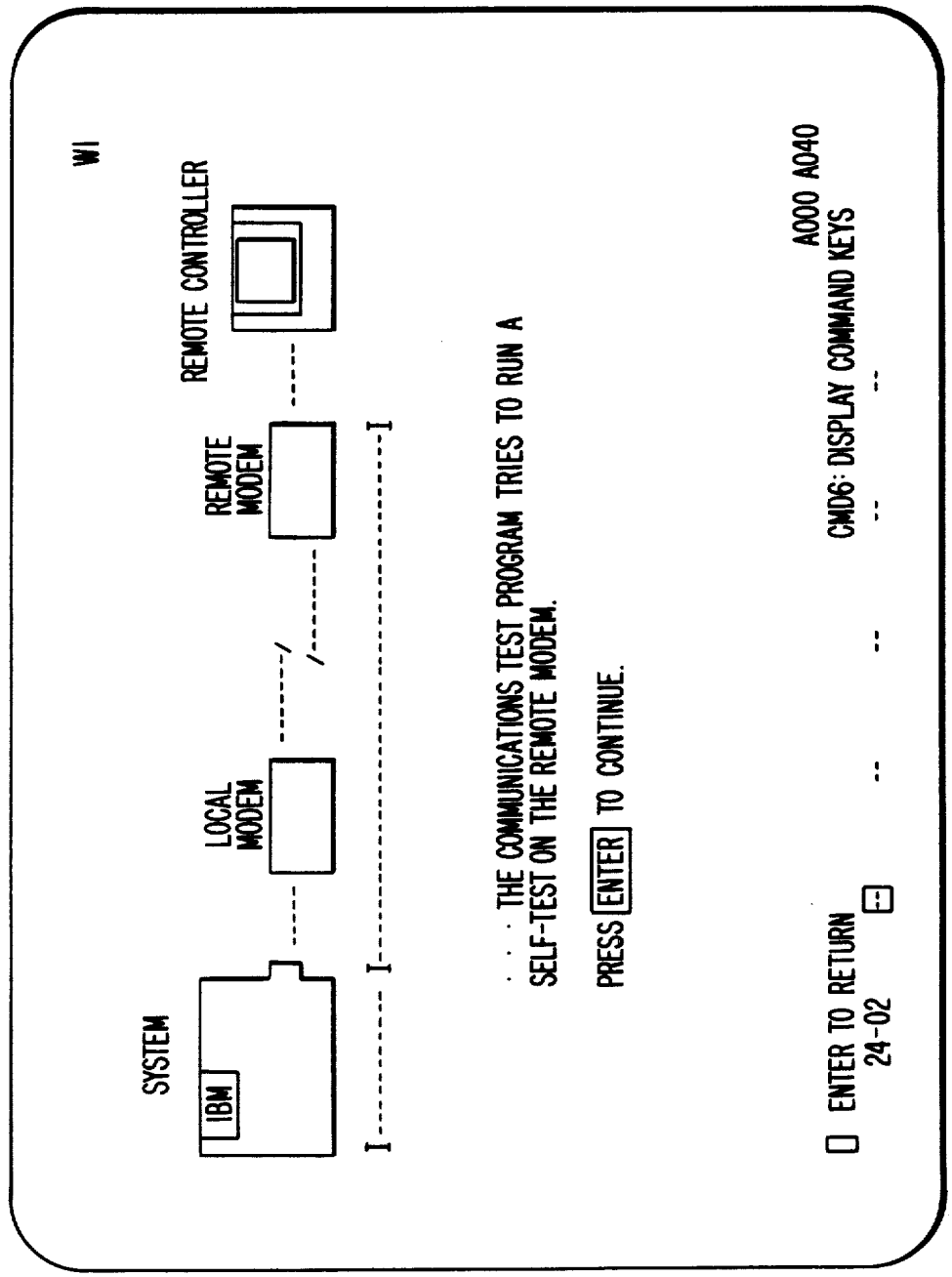
FIG. 2.22

THE COMMUNICATIONS TEST PROGRAM SENT DATA TO THE MODEM AT THE
FAILING LOCATION BUT RECEIVED NO ANSWER. THIS INDICATES A
PROBLEM IN EITHER THE COMMUNICATIONS LINE OR THE MODEM AT THE
FAILING LOCATION.

THE MODEM AT THE FAILING LOCATION CAN BE EITHER EXTERNAL TO
REMOTE CONTROLLER OR INSIDE THE REMOTE CONTROLLER.

PRESS  ENTER  TO CONTINUE.

A075 S015
24-02             ⊡              CMD6: DISPLAY COMMAND KEYS HELP
```

FIG. 2.24

HOW TO DO A SELF-TEST

HAVE THE OPERATOR AT THE FAILING LOCATION GO TO THE REMOTE MODEM AND PERFORM A SELF-TEST ON THE MODEM USING THE FOLLOWING STEPS:

1. HAVE THE OPERATOR TURN THE LARGE DIAL ON THE FRONT OF THE MODEM TO THE SELF TEST POSITION.
2. WHEN THE LIGHT MARKED TEST COMES ON, WAIT 30 SECONDS.
3. CHECK FOR THE FOLLOWING CONDITIONS (INDICATING THE SELF-TEST WAS SUCCESSFUL):
   - THE LIGHT MARKED TEST IS ON
   - THE LIGHT MARKED DATA QUALITY GOOD IS FLASHING.
   - THE LIGHT MARKED SNBU IS FLASHING (IF YOU HAVE A LIGHT MARKED SNBU)
   - THE LIGHT MARKED MODEM CHECK IS OFF.
4. TURN THE LARGE DIAL BACK TO THE OPERATE POSITION

PRESS THE [HELP] KEY TO SEE A PICTURE OF THE MODEM.

DO THEY HAVE THE CONDITIONS LISTED IN STEP 3 ?
1. YES
2. NO

☐ MAKE SELECTION
24-02

CMD6: DISPLAY COMMAND KEYS HELP.

A140 S030

W1

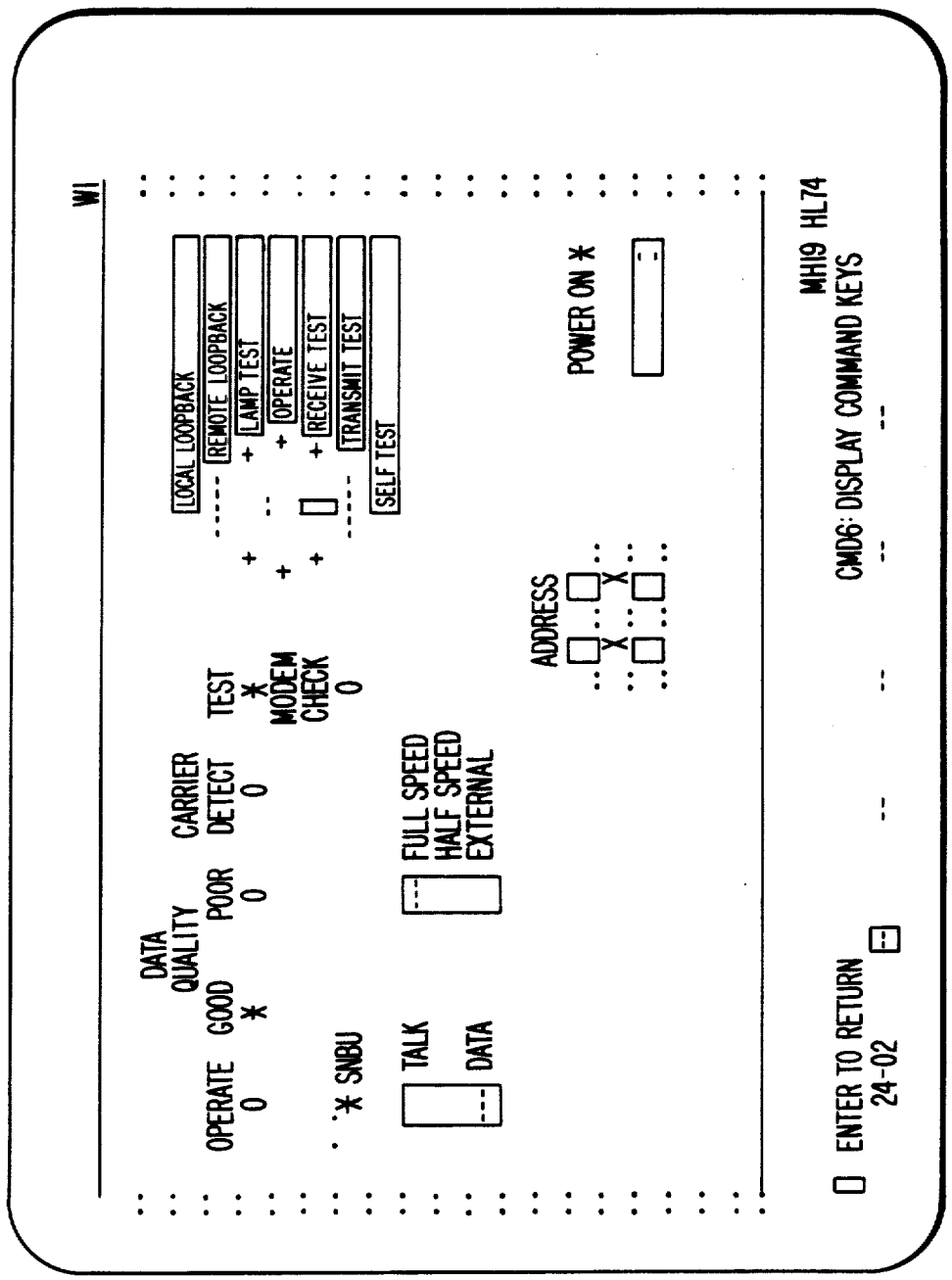
FIG. 2.25

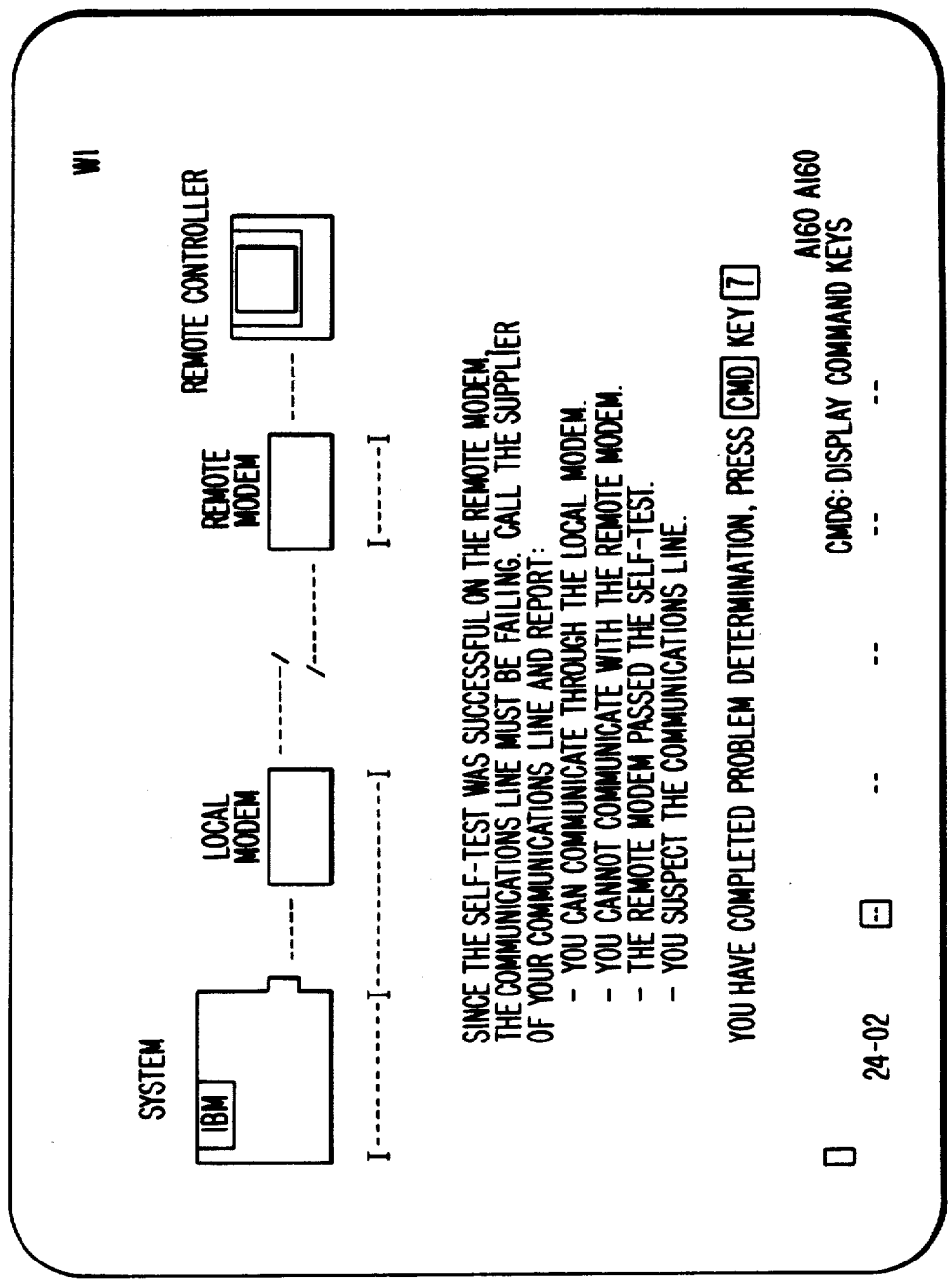
FIG. 2.26

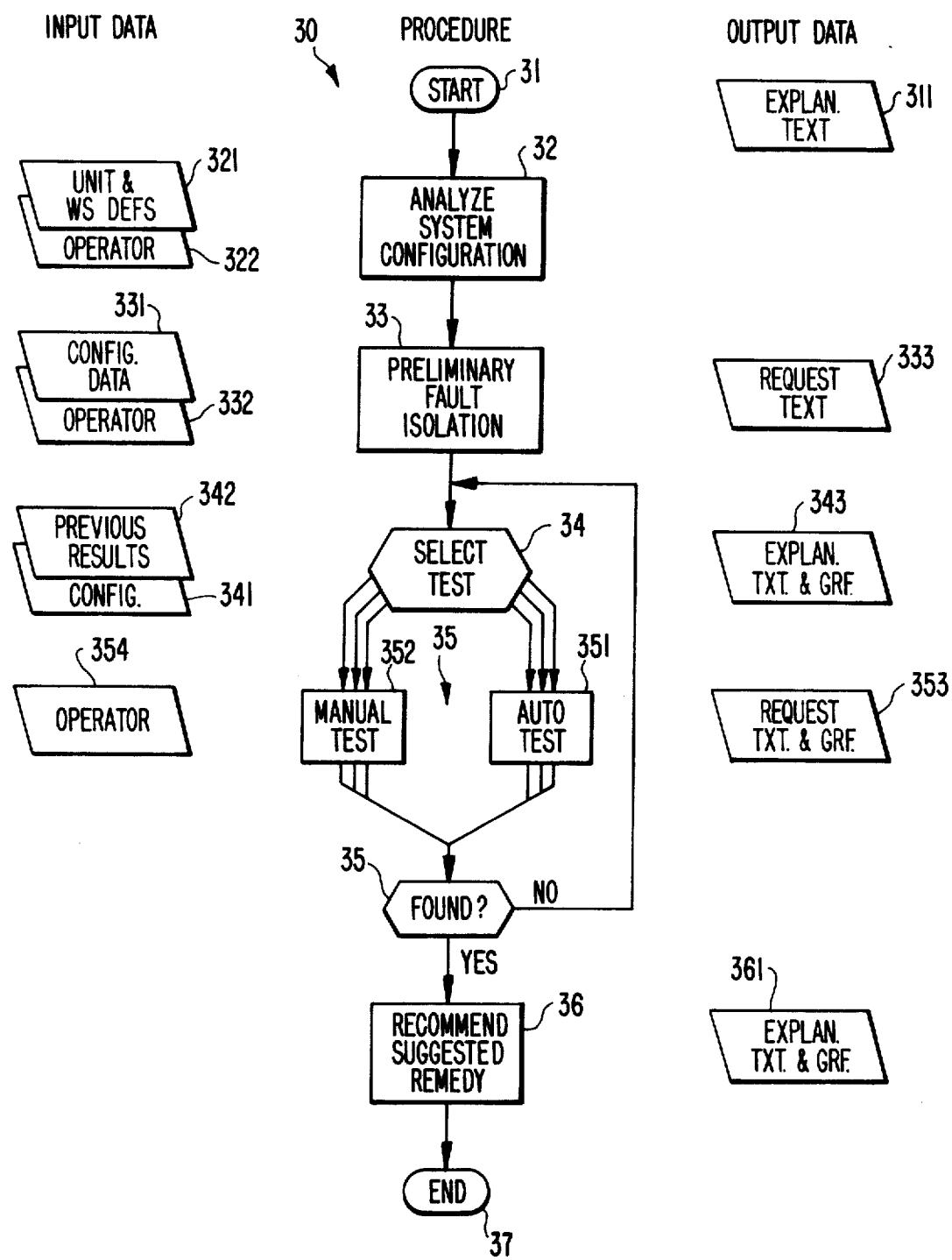

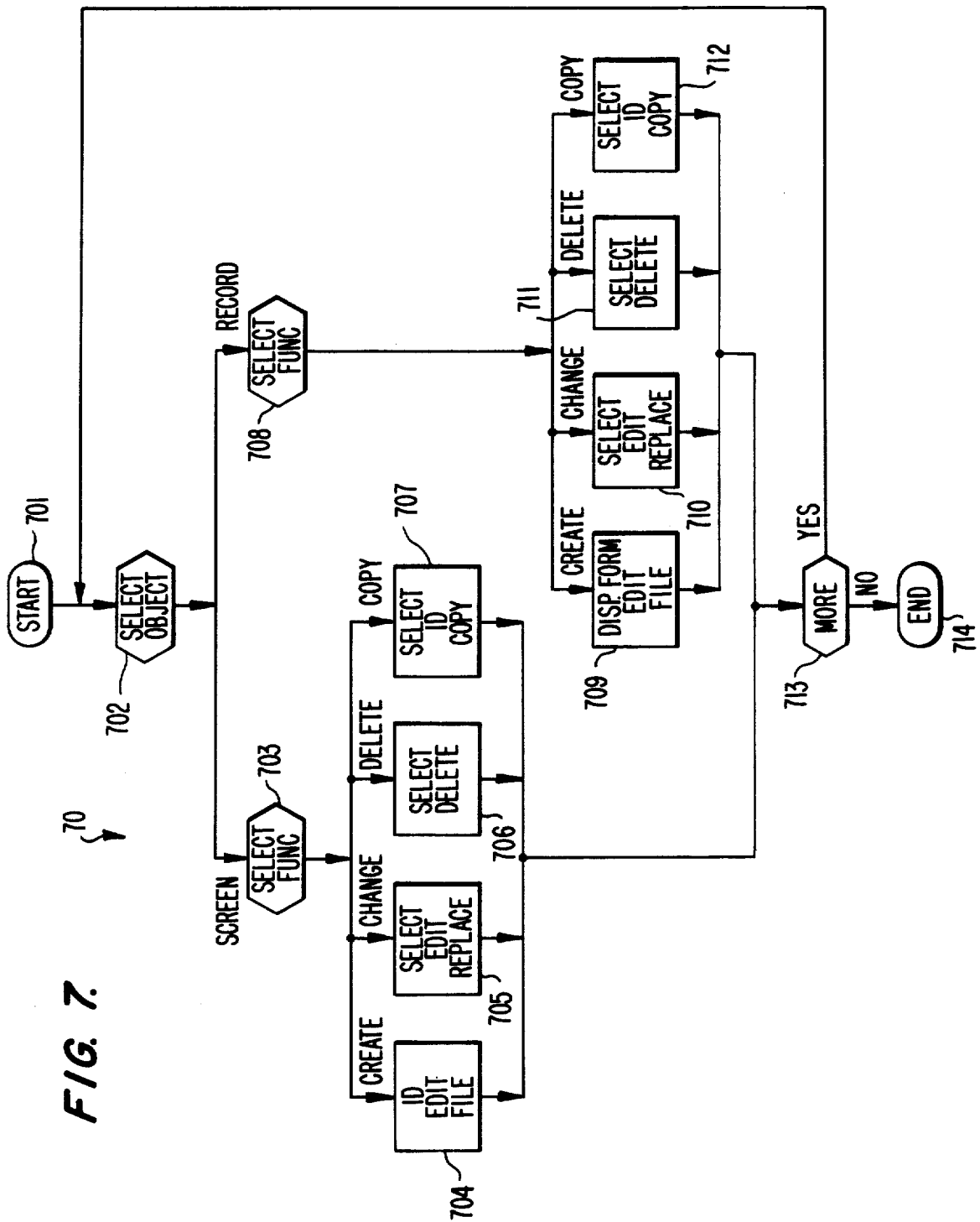

ON-LINE PROBLEM-DETERMINATION PROCEDURE FOR DIAGNOSIS OF FAULTS IN A DATA-PROCESSING SYSTEM

BACKGROUND OF THE INVENTION

The present invention concerns the diagnosis of failing components in an electronic data processing system, and more specifically relates to the use of a data-processing system itself to aid an untrained operator in determining the source of a problem in a subsystem of that same system.

There was a time when a new computer arrived on the customer's premises accompanied by one or more service representatives who installed the system and remained forever to fix it as required. More recently, failures are diagnosed and repaired by telephone calls to service representatives, who may arrive at the customer's site to find anything from a simple loose cable to the digital equivalent of a meltdown.

As computers become smaller, more numerous, and more widely distributed, the cost of service becomes ever larger relative to the cost of the hardware itself. Also, contemporary small business systems, such as the IBM System/36 and System/38, are designed to run at a customer site without a professional data-processing staff or any other trained personnel. The situation is further complicated by the fact that several different suppliers may be involved, for example, the system supplier, a modem supplier, a communications-line supplier, and so forth. When a communications problem arises, the system supplier's representative may arrive to find the problem lies in the communications line, or that the fault is caused by equipment at the other end of the line, hundreds of miles away. These are not new problems, but they become much more acute as the individual systems become less costly and more numerous.

Several strategies have evolved to meet this problem, such as depot or carry-in service, and element-exchange servicing. One attempt to alleviate the high cost of providing service is to provide a document which leads untrained customer personnel through some simple problem-determination procedures (PDPs), to try to diagnose and solve some problems, or at least to isolate the problem to determine which service representative should be called. In a recent example, an 600-page manual was in development to lead customer personnel through problem determination in the communications subsystem of a small business processor. The manual, although skillfully prepared, proved difficult to use and its very size was felt to intimidate the users. For larger processors, diagnosis by a program running on a remote computer has been attempted. This approach, however, requires some relatively sophisticated equipment at the target system, and, if the network fails, no additional problem isolation can be done.

SUMMARY OF THE INVENTION

The present invention provides a simple procedure for isolating and diagnosing faults in a subsystem of a data processing system. The invention uses the system itself to lead an operator through an on-line problem-determination procedure (OLPDP)—that is, a procedure which runs on the same system whose components it tests. The procedure can obtain from the system itself information required to determine which components are present in the configuration of that particular system. It displays to an operator both textual and graphic information concerning the status of components and their indicators, and can request the operator to set certain controls, obtain information, and take other actions, such as calling another operator at a remote location. The procedure receives inputs from both the system and the operator to determine a sequence of test routines to run against particular components, in response to the inputs and also in response to the results from previous tests in the sequence.

Usability is enhanced by providing both textual and graphic indications of test progress, optional help texts and graphics images which can be selected by the operator at many points, and specific analysis of the reasoning behind the procedure's conclusions. The procedure operates as though it were an on-line diagnostic manual, from which all pages extraneous to the particular problem at hand have been removed, and in which all relevant facts available to the system itself are input automatically, without requiring the operator to obtain them.

BRIEF DESCRIPTION OF THE DRAWING

FIG. 2, comprising FIGS. 2.1–2.26, shows a sequence of display-screen images generated in the course of a typical problem determination procedure run using the invention on the system of FIG. 1.

FIG. 3 is a high-level flow chart of a problem-determination procedure according to the invention.

FIG. 7 shows a modified conventional procedure for creating screen image files such as those used in FIG. 2.

DESCRIPTION OF A PREFERRED EMBODIMENT

Figure 1:
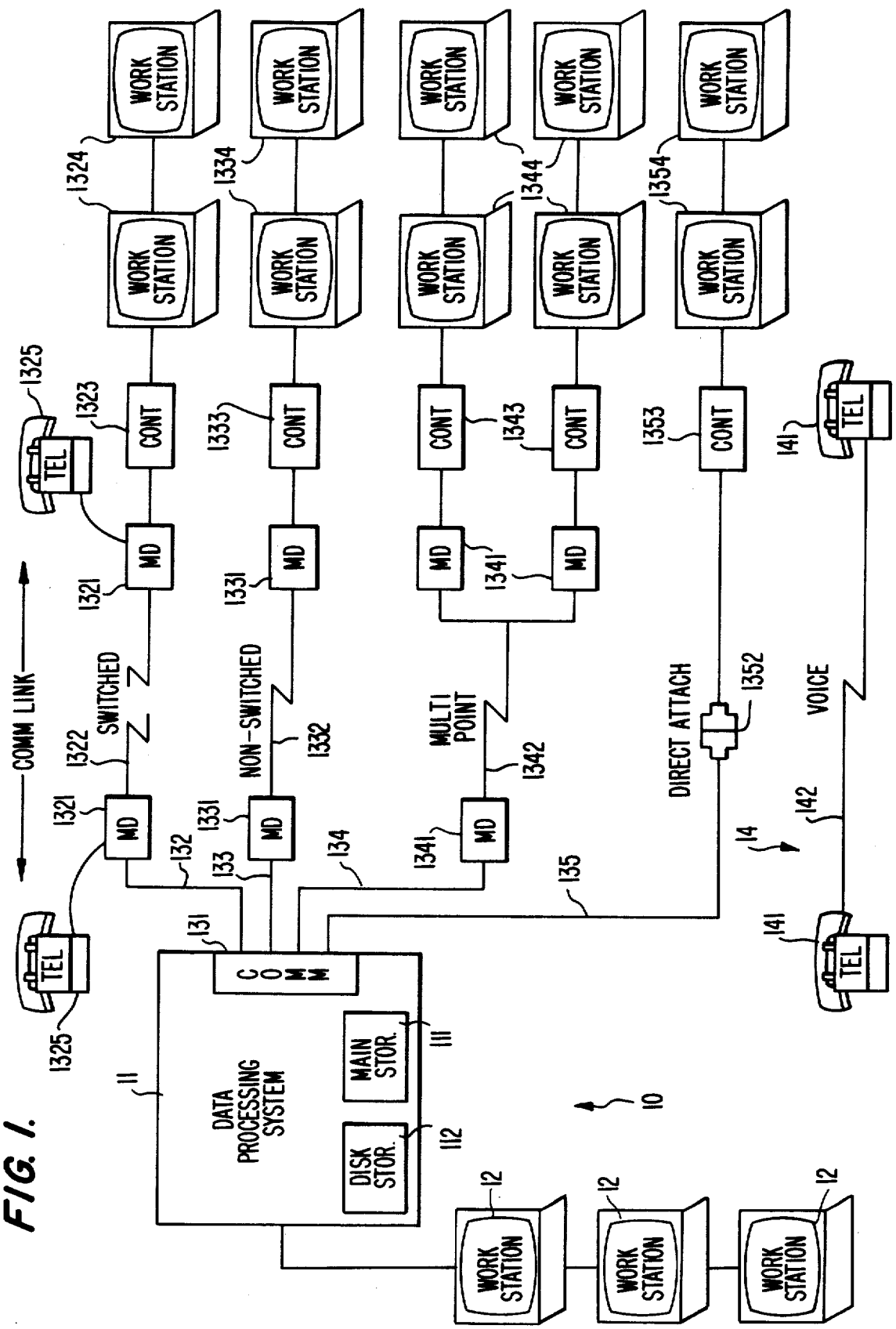
FIG. 1 is a block diagram of a data-processing system for carrying out the invention.

FIG. 1 is a high-level block diagram of a general-purpose data-processing system 10 which is both the subject and the object of the present invention. That is, system 10 itself executes a problem-determination procedure in order to diagnose faults in some of its own component parts: specifically, in its communications subsystem.

At the level shown in FIG. 1, the components of system 10 are of conventional design. Data processor 11 contains both electronic random-access main storage 111 and direct-access bulk storage such as one or more hard disk drives 112; these units may contain code and data for system functions and applications, and also for the problem-determination procedure of the invention. User interaction and control occurs through one or more local workstation display terminals 12 connected to a common cable 121. Processor 11 may be a publicly available IBM System/36 (IBM5360) unit, and terminals 12 may be IBM5251 or IBM5292 workstation units.

Conventional communications subsystem 13 interfaces remote users—on the next floor or thousands of miles away—to processor 11. Four-line communications adapter 131 resides physically within processor 11. A first line 132 may employ modems 1321 (such as IBM3864-2) to couple a switched voice-grade communications link 1322 using a remote controller 1323 for workstations 1324. Telephones 1325 share the same link 1322. A second line 133 may employ high-speed modems 1331 operating over a non-switched or dedicated data link 1332. Controller 1333 serves remote workstations 1334. A third line 134 may use a master and multiple slave modems 1341 on multi-point data link 1342. Several controllers 1343 connect to workstation terminals 1344 at several different locations. Finally, line 135 may employ a direct attachment 1352 to controller 1353 and terminals 1354 at short distances from processor 11. Controllers 1323-1353 may be IBM 5251 Model 12 or IBM 5294 units, and terminals 1324-1354 may be of the same type as terminals 12.

The problem-determination procedure also utilizes a voice link 14 between processor 11 and the remote locations. Ordinary telephones 141 operating over switched link 142 are sufficient.

FIG. 2 shows a sequence of screens 2.1-2.26 appearing on a local workstation 12, FIG. 1, in the course of an exemplary run of an on-line problem-determination procedure (OLPDP) according to the invention.

In FIG. 2.1, an operator using one of the local workstations 12, FIG. 1, as a system console first becomes aware of a problem when the message:

"CONTROL UNIT FOR DISPLAY STN A1 NOT COMMUNICATING"

appears on his screen during the course of running normal application programs on system 10. His next step is to bring up the main system menu.

FIG. 2.2 shows the main system menu. The operator enters choice "8" at the lower left corner to select the OLPDP facility.

FIG. 2.3 confirms the choice and begins the procedure.

FIG. 2.4 requests the operator to input information he may—or may not—have as to the location of the problem. In this example, he knows from the messages in FIG. 2.1 that a remote location is failing, so he selects item "2" in the entry area at the lower left corner of the screen. (Selecting item "3" would have provided assistance to find the answer to this question.)

FIG. 2.5 provides an entry point to a short tutorial. It can be viewed, printed, or bypassed by the operator.

FIG. 2.6 is a screen chosen by the OLPDP in response to the information input by the operator in FIG. 2.4. Here, the operator does not know whether or not all the remote units have failed, so he selects item "3" in the entry area.

FIG. 2.7 requests additional information concerning the origin of the problem. Since the screen shown in FIG. 2.1 had produced the "SYS-7750" error message, he selects item "1" in FIG. 2.7. If the operator has forgotten the message, he can recall it by a conventional system-history utility.

FIG. 2.8 attempts to narrow the search to one of the communications lines 132-135 shown in FIG. 1. The operator selects menu item "5" because he doesn't know which of the four lines is failing FIG. 2.9 requests additional information to determine which communications line is causing the problem. Here, the OLPDP requests some added information needed to help it find the answer. In this case, the operator enters "A1" in the data-entry space at the lower left corner of the screen.

FIG. 2.10 informs the operator of the answer it has found, for future reference.

FIG. 2.11 requests the operator to perform an action on the system, so that the OLPDP can perform a particular test routine. The operator presses the "Enter" keyboard key to continue, after he has done the task.

FIG. 2.12 reports the completion of the OLPDP routine, and its results.

FIGS. 2.13 and 2.14 request the operator to perform another action on the system, so that the OLPDP can perform additional tests. As will be explained later, the point in the OLPDP sequence at which a screen appears is identified by an index number at the lower right corner of the screen; in FIG. 2.11, this index is U090, while it is U210 in FIG. 2.14.

FIG. 2.15 reports the results of this test routine, indicating that the line is still not operational.

FIG. 2.16 requests the operator to contact another person, at the site of the remote controller on the failing line, to have the other person provide information which the OLPDP can't obtain by itself. This screen presents a graphic schematic image of the pertinent part of the system configuration, as determined previously by the OLPDP. This example corresponds to line 133 in FIG. 1, a non-switched point-to-point line with a particular modem type. A telephone line such as 14 can be used to contact the person at the remote location. FIG. 2.16 requests the type of modem at the other location, that is, the right-hand modem in the graphic image. The remote operator's response is entered by the local operator in the lower left (entry) area of the screen.

FIG. 2.17 presents the OLPDP response to the entered information, and asks for confirmation. In this case, the local operator confirms the information by selecting menu item "1". He could, however, have selected item "3" to allow the system to use its current configuration instead.

FIG. 2.18 informs the operator what the OLPDP will do next, and offers him an opportunity to obtain more details of these actions. An important human-factors aspect of so-called expert systems is that they not only reason correctly, but that they can explain their reasoning to a human operator. In this example, the operator has indicated his desire for more information by pressing the keyboard "Help" key.

FIG. 2.19 explains the pertinent part of the system configuration in graphic form, and allows the operator to obtain more information by pressing the "Help" key.

FIGS. 2.20-2.22 explain each step separately, showing the system portions tested by means of a progressively expanding "I I" symbols under the graphic image of the system on each screen. In each screen except the last, the operator is given a choice as to whether to proceed with more help screens.

After the last help screen in this sequence, control returns to the screen of FIG. 2.18. This time, the operator presses the "Enter" key instead of the "Help" key. This invokes a communications test routine to analyze the problem.

FIG. 2.23 explains the results of the test just completed. Since the OLPDP cannot isolate the problem, it will now ask for additional information from the remote operator.

FIG. 2.24 requests the local operator to have a person at the location of the remote modem perform a specific test. The OLPDP has selected the appropriate test, and now instructs the operator on how to run it. Additional information can be requested by pressing the "Help" key.

FIG. 2.25 presents a graphic image of the remote modem. The OLPDP selects this picture from a group of modem panel images in response to previous information specifying the type of the remote modem; cf. FIG. 2.16. Note that the graphic shows the panel controls in their proper positions according to FIG. 2.24, and the indicators show how a successful completion would appear.

When the operator is finished with the graphic screen of FIG. 2.25, he returns to FIG. 2.24 by pressing the "Enter" key. This time, he replies to the request for the test result by entering a "1", indicating that the remote modem is performing correctly.

FIG. 2.26 then appears on the console screen. The graphic image of the pertinent part of the system shows, by means of the "I   I" symbols, the components which have tested good. The text below this pictorial representation reports the most likely cause of the problem to be a failing communications line, and directs the operator to call his communications supplier for further action. The text on this screen further explains what reasons the OLPDP has for believing this system component to be at fault. Finally, the screen allows the operator to end this problemdetermination procedure by pressing a command key, "Cmd 7", on his keyboard. (The "Cmd 7" key could have been pressed in any of the previous screens as well, to abort the entire procedure immediately.

FIG. 3 is a high-level flow chart of an on-line problemdetermination procedure (OLPDP) program which can be executed on system 10, FIG. 1. Like many other things, OLPDP is relatively simple in concept, but somewhat complex in implementation. Procedure 30 begins at start block 31 when an OLPDP is requested.

Start block 31 produces display screens containing explanatory text 311 concerning the procedure, such as that shown in FIG. 2.3.

Block 32 analyzes the configuration of communications subsystem 13, FIG. 1, to determine which components are present: how many communication lines, what types of controllers and modems, and so forth. This data may come from a conventional Unit Definition Table and Workstation Definition Tables 321 already stored in system 10. Additional or modified data 322 may be input by the operator in response to one or more screens containing text 333 requesting answers to specific questions, such as in FIG. 2.16 above. Block 33 performs some preliminary fault isolation, using the previous subsystem configuration data 331 and operator inputs 332 in response to request text 333 on one or more console screens. In the above example, FIGS. 2.4–2.10 request that the operator input certain information aiming toward eliminating a part of subsystem 13 from further consideration. The requested data can easily be structured in such a way that large sections of the subsystem can be eliminated quickly when sufficient information is known, yet detailed information can be obtained concerning subgoals when necessary to achieve the larger goal. For example, an operator response of "1" or "2" in FIG. 2.4 would eliminate a large part of the subsystem at a single stroke. But, because the operator did not have enough information to achieve this larger goal, block 33 broke the problem into smaller pieces. The operator's "don't know" answer to the request text 333 in FIG. 2.6 then required another subgoal, and the operator's input to the requested data in FIG. 2.7 finally resolves the original question: the problem was occurring at a remote location, and not at a local location. FIGS. 2.8–2.10 resolve the question as to which of the four communication lines 132–135, FIG. 1, is being analyzed. Block 33 then builds a configuration record 341 of possibly failing components in the communications subsystem. The order of blocks 32 and 33 is not significant; in fact, these two functions can be intermixed in a single implementation module.

Decision block 34 next selects one of a large number of test routines 35 to determine which component of subsystem 13 is actually failing. The particular test is selected on the basis of which components are included in that part of the subsystem found to be at fault, from configuration data 341 developed by block 33, and also from the results 342 of previous tests 35 which may have been performed. Explanatory text and graphics 343 may be presented to the operator during this step, to inform him of the progress of the procedure.

There are two types of test 35. An automatic test 351 is able to provide and to receive directly the information it needs to perform its functions. Certain modems, for example have provisions for setting their controls and for outputting the status of their indicators in a digital form accessible to an associated processor. A manual test 352 services other equipment or other functions. In this case, request text and graphics 353 obtains input information or a specific action 354 from the operator. FIG. 2.11, for instance, contains request text 353 asking the operator to enter a certain system command 354 at his console. A test 352 then determines that this command executed successfully. That data becomes part of the previous results 342 used to select 34 the next text. FIG. 2.12 contains explanatory text 343 concerning the test results. FIGS. 2.13–2.15 show a similar sequence with a different outcome. FIG. 2.16 then directs another operator action 354. FIG. 2.17 contains explanatory text and graphics 343 showing the makeup of the failing line as determined by the OLPDP in steps 32 and 33, and requests operator confirmation. (If he had selected menu item "3" for "don't know", block 34 would proceed on the basis that the configuration data 331, derived from the definition tables 321, was in fact correct.) FIGS. 2.18–2.22 contain additional explanatory text and graphics 343, some of which was requested as additional explanation by the operator. Explanatory text is used even where an automatic test 351 is run. FIG. 2.23, for example, informs the operator of the results 342 of several automatic tests 351. FIGS. 2.24–2.25 give both textual and graphic instructions for setting up a particular modem test, as described earlier.

Block 35 returns control to test-selection block 34 after each test 35 has run, unless the record of test results 342 indicates that the problem has been determined at that point.

Block 36 responds to the sequence of test results 342 to recommend a specific remedy, by means of text and graphics 361. FIG. 2.26 explains that a specific communications line appears to be at fault, and recommends that the proper person be called to repair the failing equipment. Again, graphics symbolism shows the components which had tested good, and the text outlines the reasons why the OLPDP believes that equipment to be at fault.

Block 37 ends the OLPDP 30 when the operator presses a particular keyboard key, "Cmd 7". Pressing this key at any time during the procedure will abort the execution. Control passes from block 37 back to the main system menu, FIG. 2.2.

Figure 4:
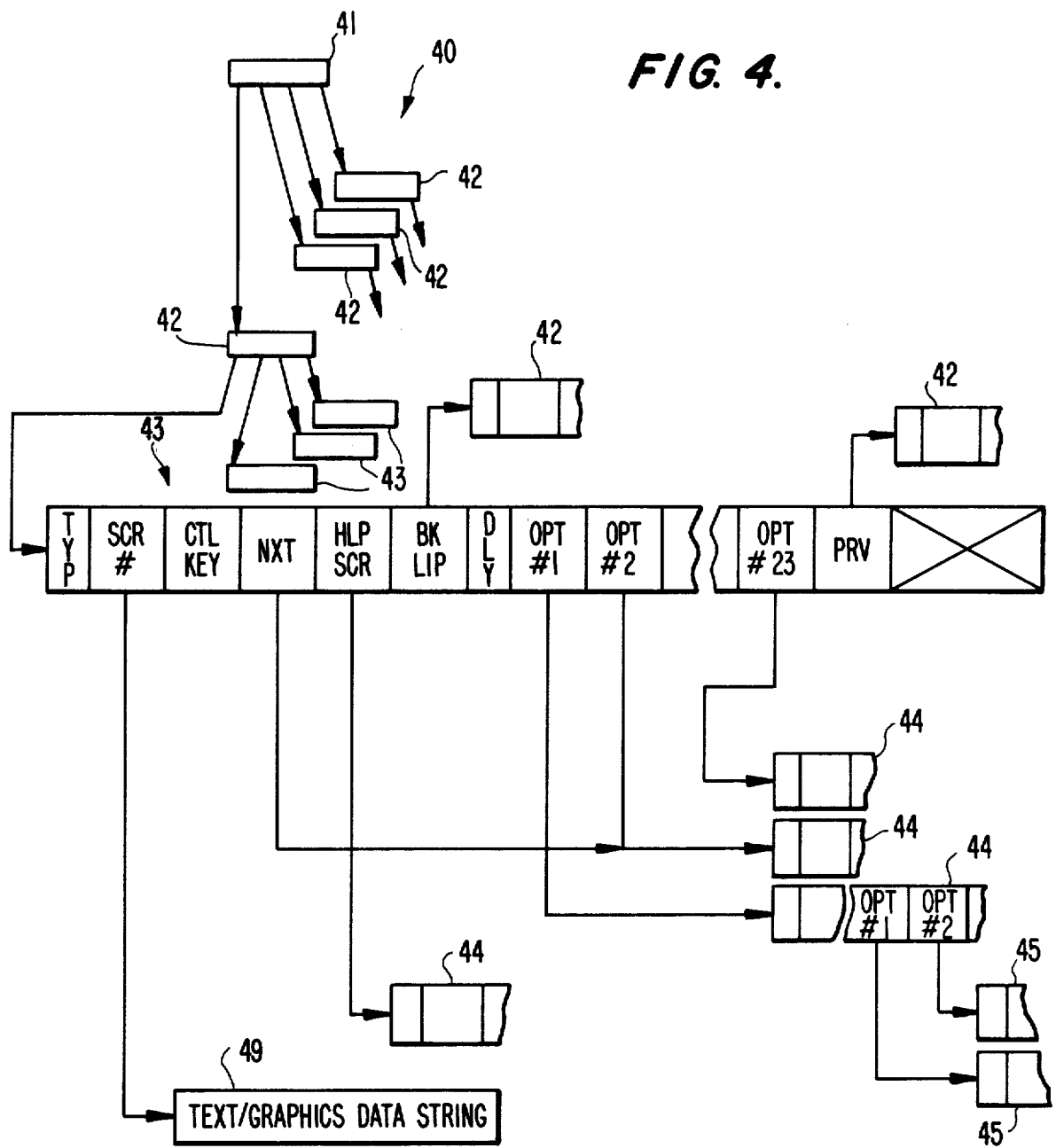
FIG. 4 shows a sequence of control records for carrying out the functions of FIG. 3.

FIG. 4 shows a sequence 40 of tree-structured control records for implementing procedure 30. Start block 31, FIG. 3, accesses root record 41, which contains pointers to second-level records 42, which in turn point to third-level records 43, then 44, 45, and so forth.

Each 128-byte control record such as 43 contains a number of fields. A two-byte TYP field 431 indicates that the record is one of several different types, as listed below.

I1—Information: Presents explanatory text and/or graphics to the operator on his display screen.
M1—Menu: Presents text/graphics and requests the operator to select among a set of specified choices.
C1—Call: Calls and performs a program named in the record.

A four-byte SCR# field gives an index number of the text/graphics screen to be displayed on the console at that point. These numbers can be displayed at the lower right corner on most of the screens, such as the "9060" designation in FIG. 2.4. In a C1-type record, this field designates a program to be executed; no screen is displayed. A four-byte CTLKEY field identifies that control record; it is the identifier used to designate which record to process. A four-byte NXT field contains the identifier of the control record is to be processed after any program called by that record has completed its execution. HLPSCR is a four-byte pointer containing the designation of the control record to be processed if the operator requests additional help material (by pressing the keyboard "Help" key) while he is viewing the current record. PRVSCR is a four-byte pointer to a previous record which would be processed if the operator presses the "Cmd 1" key to review his progress through the procedure; this record can be explicitly specified by the procedure designer, and is not merely the previous record in the sequence. DLY represents a time delay which can be set to sequence automatically through a series of I1 screens; it can be used to provide animated graphics, for example.

OPT#-OPT#23 are four-byte pointers allowing the operator to select which control record shall be processed next. These options can by associated with respective menu items on an M1 or M2 menu screen. For example, selecting menu item "1" in FIG. 2.7 causes record "9130", whose screen is displayed in that figure, to process record "UO11", FIG. 2.8, next; selecting menu items "2" or "3" in FIG. 2.7 would have accessed the records specified in OPT#2 and OPT#3 fields of record 9130 respectively for processing next. For an I1 or L2 type control record, OPT#1-OPT#23 may contain pointers to a series of help screens to be displayed successively for each depression of the "Help" key by the operator. BKUP designates the previous record, to be processed if the operator presses the "Cmd 2" key; it is typically treated the same as the PRVSCR field. The remainder of the record is unused.

Root record 41 must be recognizable to the procedure which processes the control records. It is actually identified to its control program by CTLKEY="####". It may also contain other information, such as TYP=I1, SCRN#="CK2" (the control record for the main menu of system 10), and NXT="AOOO", the first screen in the OLPDP.

The actual screen identified by the SCRN# field of a control record such as 43 is implemented simply as a string 49 of alphanumeric character data. Each string contains 1760 characters, which are displayed as 22 lines of 80 characters each. The first 1756 bytes of string 49 contain arbitrary character codes, which may signify either alphanumeric text or graphic images built up from various shapes in a character font. (If desired, bit-mapped or other less coarse graphics may obviously be used instead.) The last four bytes of string 49 defines the screen number SCRN#. For example, the characters "9060" at the lower right of FIG. 2.4 represent the contents of the SCRN# field for that control record. All strings 49 are stored together in a conventional indexed data file residing on a disk in storage 112, FIG. 1.

Figure 5:
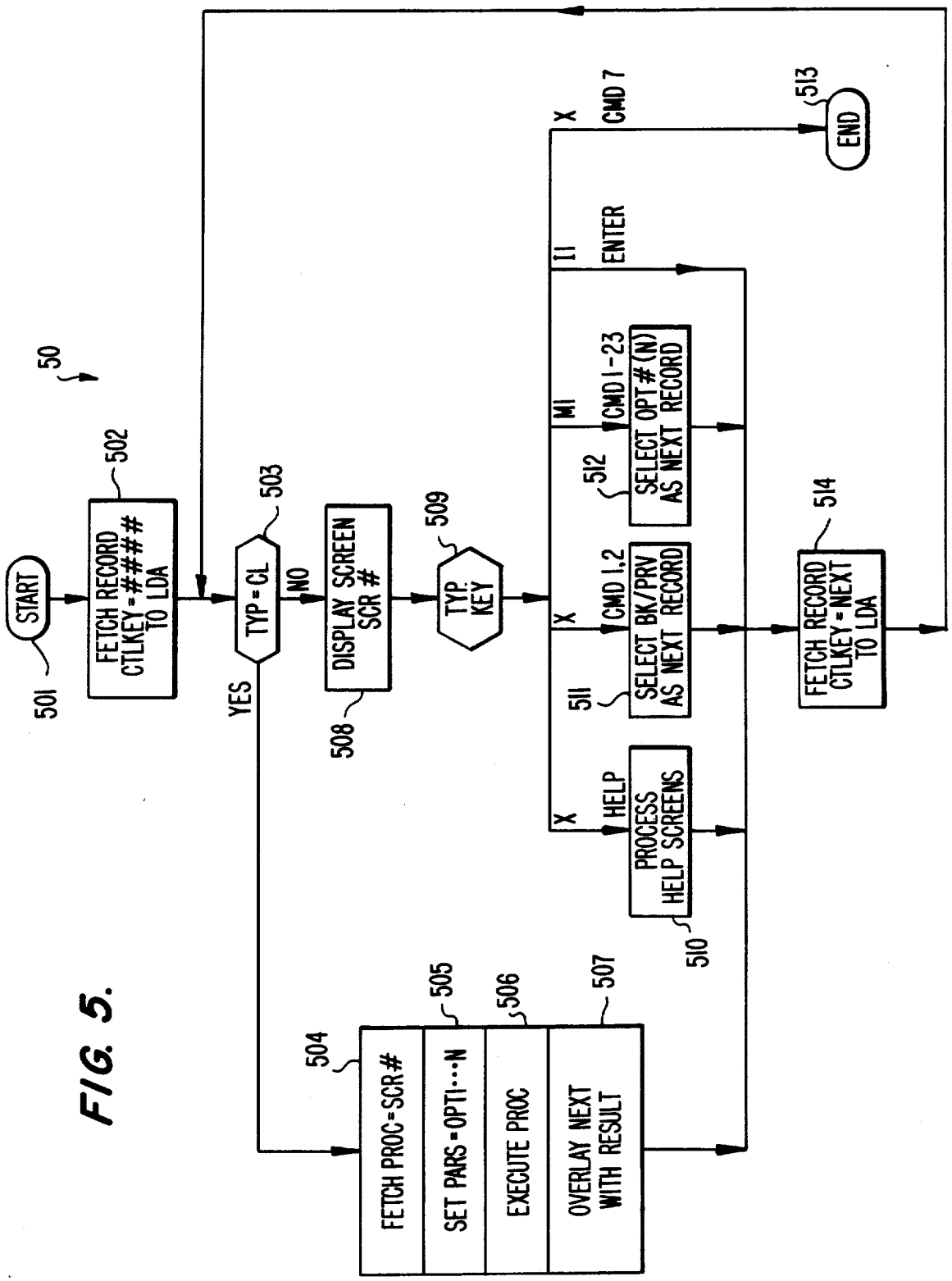
FIG. 5 is a flow chart of a program for sequencing the control records of FIG. 4.

FIG. 5 is a flow chart of a simple driver program 50 for sequencing through the control records of FIG. 4. That is, driver 50 traverses a particular series of the records 40 in response to system conditions and operator inputs. It is this action which in fact constitutes the implementation of the functions of procedure 30, FIG. 3. After starting at 501, block 502 fetches the root record, identified by CTLKEY="####", into a local data area LDA. Whenever program 50 looks at or modifies the current record, it operates upon the copy in the LDA, rather than upon the original record. If the current record is a procedure-call record (TYP=C1), block 503 passes control to block 504. Block 504 fetches the procedure specified in the SCR# field of the current record. Any input parameters required by this procedure are taken from the OPT#1, OPT#2, etc. fields of the current record in block 505. Block 506 then causes the procedure to execute. Upon completion of the procedure, any result code returned by the procedure is placed into the NEXT field of the current record copy in the LDA, overlaying its previous contents. This is the way the procedure can affect the sequence of control records which are processed, depending upon the results of a test or other operation.

If the current record is not a C1 record, block 503 causes block 508 to display the screen specified by the SCR# field. Next, decision block 509 causes one of several paths to be taken, depending upon the type of the current record and the keyboard key pressed by the operator. Block 510 processes help screens are described above, when the "Help" key is pressed for either an I1 or an M1 record. If the "Cmd 1" or "Cmd 2" key is pressed for either record type, block 511 overlays the NEXT field of the current record in the LDA with the contents of the BKUP or PRVSCR fields from the record. For an M1 (menu) record type, block 512 overlays the NEXT field with the contents of one of the option fields, OPT#1-OPT#23, depending upon the number key pressed by the operator in response to the choices presented by the screen displayed by the SCR# field of that record (block 508). Pressing "Cmd 7" passes directly to block 513, to end the entire sequence of control records.

After blocks 510-512, or directly after block 509, if the "Enter" key is pressed for an I1 record, block 514 fetches the record specified by the appropriate field—NEXT, BKUP, PRV or OPT#(N)—of the current record, and returns to block 503. Since the NEXT field may have been overlaid in block 507, the sequence of records can be altered by the test-procedure results.

Blocks 32 and 33 of FIG. 3 are actually implemented by running the driver program of FIG. 5 on a sequence of the control records shown in FIG. 4. Most of the functions of blocks 32 and 33 are achieved by C1-type records calling short routines which determine specific information from information tables already stored within the system for other purposes, then produce a result code to affect the record sequence, as described above. Moreover, the implementation frequently intertwines functions from both blocks in the same routine;

that is, blocks 32 and 33 are logically distinct, but this embodiment actually performs them together.

Figure 6:
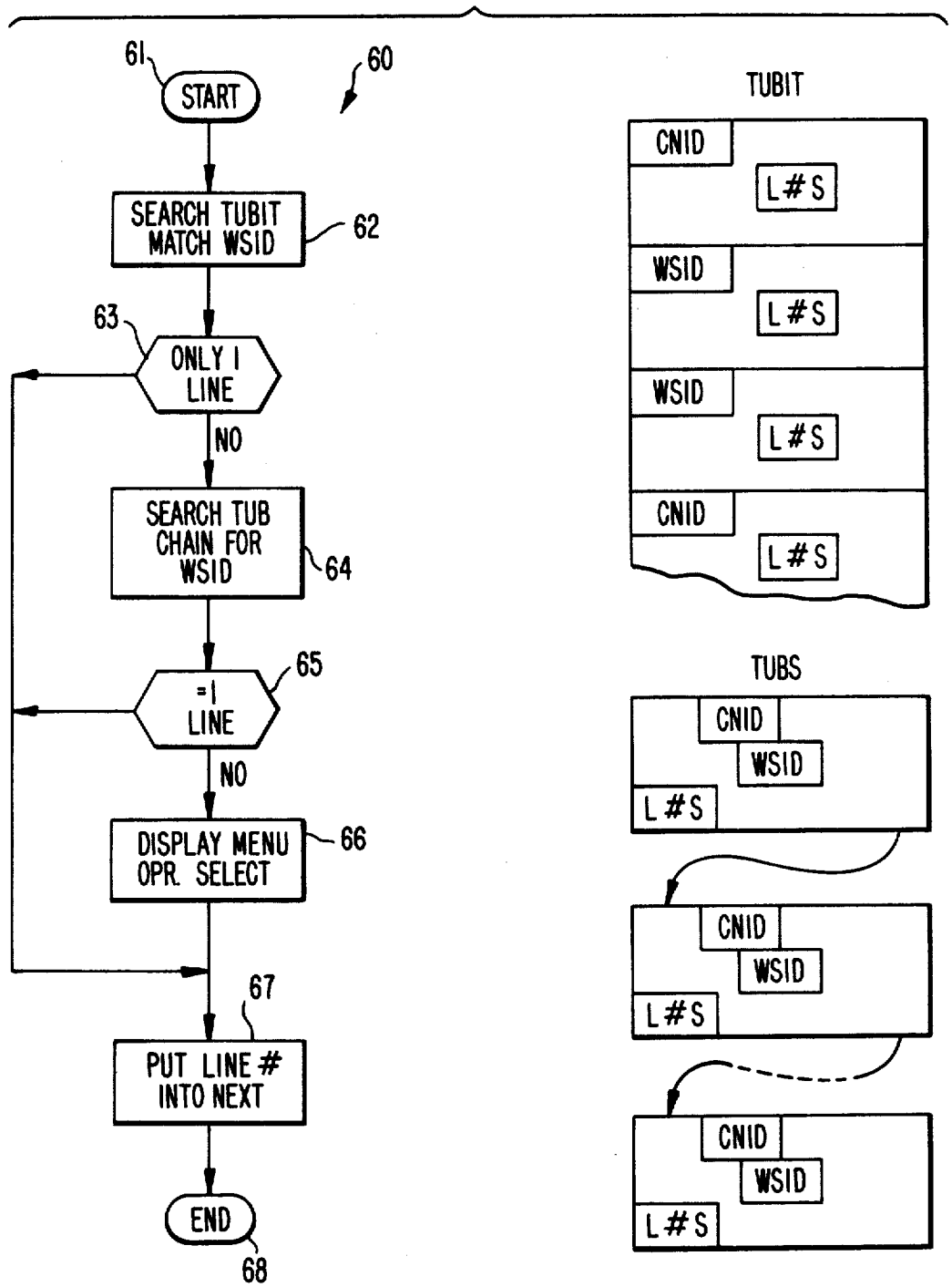
FIG. 6 is a flow chart of an example of a routine used in the configuration-sensing procedure of FIG. 3.

FIG. 6 illustrates a representative routine 60 for execution by a control record in block 32. Its purpose is to determine which communications line serves a particular workstation terminal known to be having a problem. (At this point in the OLPDP, it is not yet known whether the workstation itself is at fault, or a failure somewhere else causes it not to work properly.)

Block 61 starts the routine, and picks up a any input parameters, as described above. Block 62 searches a unit definition table called a Terminal Unit Block Information Table TUBIT, which contains a separate entry for each controller and workstation in the system. Each entry contains an identification code CNID or WSID for its unit. Each entry also contains a byte L#S having a "1" bit for each communications line which that unit could potentially be attached to. If the L#S field for the entry having the desired workstation WSID is connected to only a single line, then some component of that line must be at fault, so block 63 goes directly to block 67, where a code representing the number of that line replaces a part of the NEXT field of the control record copy in the LDA, as described in connection with FIG. 5.

Otherwise, block 64 searches through the WSID fields of unit definitions in the form of a series of TUBs chained together in a conventional manner; the CNID fields here indicate which controller is associated with that workstation. The search determines whether or not that workstation is actually connected to one and only one communications line at this time. (It could be connected to a single line, or it could be turned off—i.e., not connected to any line.) If so, block 65, passes to block 67. If not, block 66 displays a menu of possible line numbers, and requests the operator to input the line number by observing the workstation itself. Thus, at the end 68 of sequence 60, the NEXT field of the current record contains a code specifying a line number; this code was obtained from the system information (blocks 62 or 64) if possible, and otherwise from the operator (block 66).

Implementing the invention as tree-structured control records, rather than in the direct form of FIG. 3, has a major advantage. The people who write programs are most often not the same people who write documentation; when they are the same, one or the other is likely to suffer. This problem is significant here because the present invention partakes of both natures: it is a collection of program code which must carry on a lengthy, interactive, and highly effective communication with a human operator. The solution to this dilemma is a utility program which allows a professional technical writer to enter the text and graphics of the screens, and the directions for proceeding through the screens, in a form natural to him, without concerning himself about programming as such. The utility program then converts the writer's material into a series of control records 40, FIG. 4, structured in the proper way for sequencing by driver 50, FIG. 5, which can execute any sequence of control records.

Development Support Program (DSP) 70 is a modification of a previous program originally developed for demonstrating the features of new products to prospective customers. After starting at 701, a main menu 702 allows the writer to select between working on a screen such as 311, FIG. 3, or a control record such as 41, FIG. 4. Screen-function menu 703 selects one of a number of functions to perform on a screen: create a new screen, change or delete an existing screen, or copy a screen. For a new screen, function 704 prompts the writer to specify a screen identification (the SCR# field in FIG. 4), and ensures that it does not duplicate another screen number. Block 704 then invokes a conventional editor, preferably with full-screen text and graphics capabilities. When the screen is finished, e.g., by pressing an "Enter" keyboard key, block 704 converts the entered data into the previously described data string 49, placing the screen number into the last four bytes, then stores the string into a conventional indexed data file, whence it can be retrieved by a control record.

If the writer selects the "change" function in menu 703, block 705 first requests the writer to select a screen number. He may then edit the displayed text of the screen, and replace it in the screen data file. Block 706 requests the selection of a screen, and deletes the text and SCR# in that data-file entry. Block 707 requests the selection of a screen number, then requests a new number to be assigned to the screen, and copies the text into the file under the new number.

Menu 708 allows the same functions to be chosen for control records as for screens. Block 709 allows the writer to create a new record by displaying a form showing the fields he must specify, then invokes an editor, and, when completion is indicated, places the new record in a data file indexed by the CTLKEY field of the record. Block 710 requests the selection of the CTLKEY field of a record, invokes the editor, and replaces the changed record in the file. Block 711 requests the selection of a CTLKEY, and deletes the record in that data-file entry. Block 712 requests the selection of a record, then requests a new CTLKEY to be assigned to the record, then copies it into the file under the new CTLKEY index.

When any of the functions of blocks 704–707 or 709–712 has finished, block 713 asks whether the writer wishes to choose another operation. If so, control is returned to menu block 702. If not, DSP program 70 ends at block 714.

Modifications within the scope of the concept of the invention will suggest themselves to those skilled in the art.

For example, a similar procedure can be employed to check a data processor's bulk storage subsystem, such as 112 in FIG. 1, or other I/0 subsystems such as printers or tape drives.

Increasingly sophisticated hardware or controllers may allow the system to perform more of the testing without operator intervention, such as automatic vary-on/off of equipment. External or remotely connected units could be listed in internal definition tables, so that they need not be identified manually by the operator.

Interconnected processor systems could also be accommodated. A larger "up-line" remote system, for instance could cause system 10 to execute an OLPDP, providing inputs and receiving outputs just as the operator does in the above description. Similar "peer-to-peer" systems could request each other to perform OLPDPs on themselves or on each other.

Implementation of the functions of FIG. 3 can be by any of a number of conventional means other than the control-record scheme of FIGS. 4–5, and that scheme is in turn susceptible of numerous modifications to fit specific desired applications or host processors.

We claim as our invention:

1. A method of diagnosing a problem condition in a data processing system, wherein said system itself perform the steps of:

(a) sensing a configuration of components included in said system;
   (b) displaying on said system graphic information concerning the current status of control settings and indicators of at least some of said components;
   (c) displaying textual information on said system directing an operator to perform designated actions with respect to at least some of said system components;
   (d) receiving inputs from said operator regarding the results of said designated actions;
   (e) selecting and performing tests upon particular ones of said components in response to said inputs;
   (f) repeating steps (b)–(e) in response to said tests.

* * * * *